United States Patent [19]

Roye

[11] 4,205,463
[45] Jun. 3, 1980

[54] ELECTRONIC TEACHING AID

[76] Inventor: Andrew E. Roye, 3921 Dell Rd., Carmichael, Calif. 95608

[21] Appl. No.: 904,545

[22] Filed: May 10, 1978

[51] Int. Cl.² ............................................. G09B 7/06
[52] U.S. Cl. ................................................. 35/9 C
[58] Field of Search .......................... 35/9 C, 9 E, 9 F

[56] References Cited

U.S. PATENT DOCUMENTS

| | | | |
|---|---|---|---|
| 2,586,710 | 2/1952 | Pick | 35/9 C |
| 2,943,400 | 7/1960 | Griswold | 35/9 C |
| 3,057,082 | 10/1962 | Wellington et al. | 35/9 C |
| 3,106,027 | 10/1963 | Thelen | 35/9 C |
| 3,141,244 | 7/1964 | Smith | 35/9 C UX |
| 3,177,595 | 4/1965 | Yonker et al. | 35/9 C X |
| 3,579,864 | 5/1971 | Littwin et al. | 35/9 C |
| 3,662,078 | 5/1972 | Holiday | 35/9 C UX |
| 3,696,524 | 10/1972 | Kranyik et al. | 35/9 C |

Primary Examiner—William H. Grieb
Attorney, Agent, or Firm—Blair, Brown & Kreten

[57] ABSTRACT

An electronic teaching aid including a circuit board having a plurality of numbered rows for possible questions and a plurality of circles to indicate a plurality of possible answers for the question in each row. A probe is inserted in the circle selected as the answer, and in doing so perforates a covering sheet. If the answer is correct or incorrect the probe completes an electrical circuit, thereby producing an output to light a light, ring a bell, activate a counter, or whatever desired.

6 Claims, 8 Drawing Figures

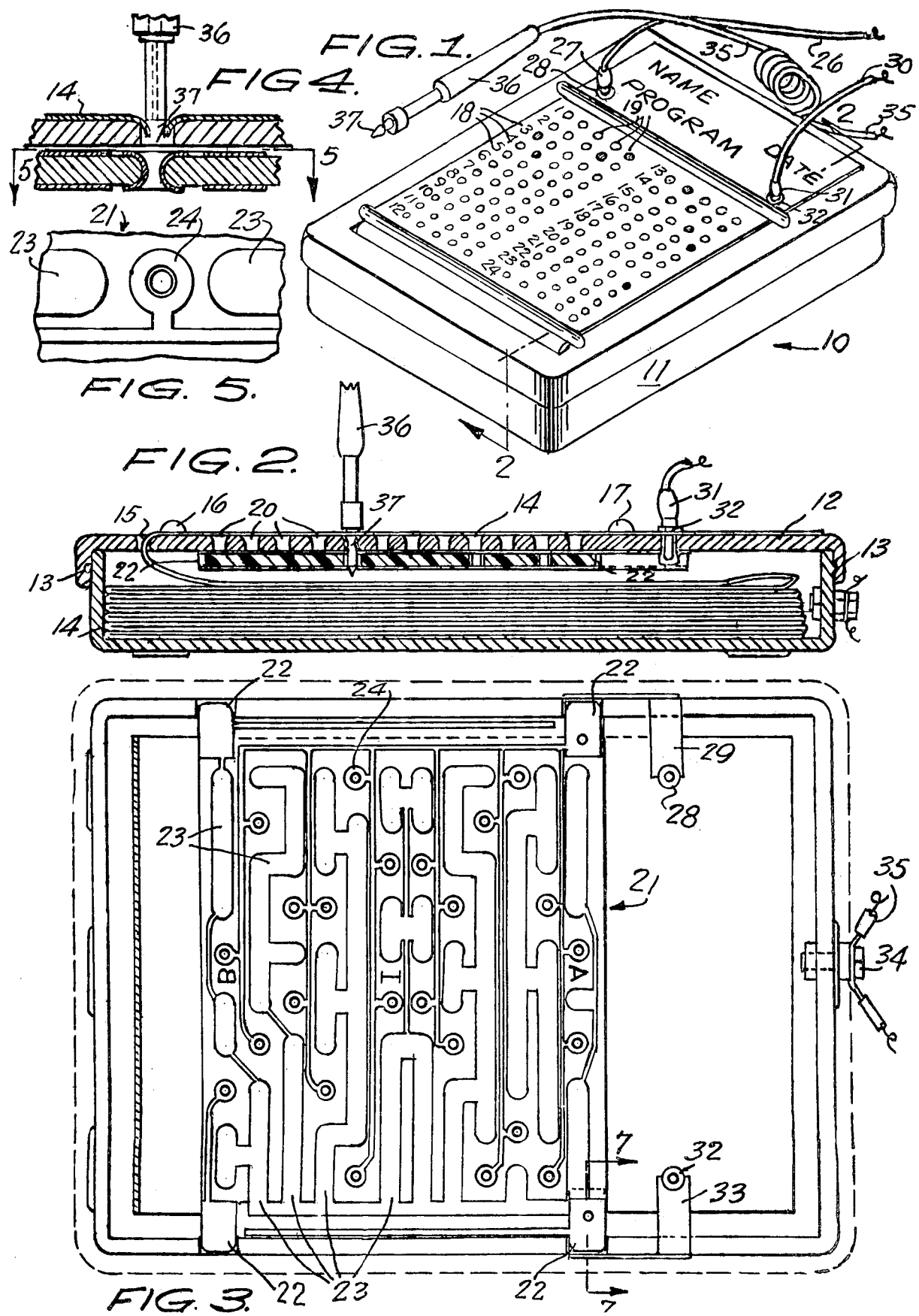

ELECTRONIC TEACHING AID

BACKGROUND OF THE INVENTION

1. FIELD OF THE INVENTION

The present invention is an electronic teaching aid. The following patents are listed as admitted prior patents and the present invention is believed patentable over these prior patents for reasons which will be set forth herein: U.S. Pat. Nos. 3,057,082 Wellington, et al; 3,579,864 Schure, et al; 3,141,244 Smith; 3,662,078 Holiday.

In the present invention there is provided and claimed an automatic electronic teaching aid that includes a casing, a removable cover, an elongated interfolded paper sheet, restraining guides, the cover having a plurality of holes drilled or formed therein, wherein there is provided an electric circuit board that can be replaced or reversed according to the subject being taught. A probe is provided for perforating the sheet and passing through one of the holes in the cover and contacting the circuit board to produce an output. The closest prior known patent is believed to be U.S. Pat. No. 3,057,082 to Wellington, et al, but in Wellington, et al there is merely shown a test scoring, recording and teaching apparatus that includes counters, signal means, a printed circuit board, a probe, and a puncturable sheet. In U.S. Pat. No. 3,141,244 to Smith, there is shown an audio-visual teaching device that includes a control unit, a sheet of puncturable material, a sheet of non-conductive material, a probe, and circuit means. Schure, et al in U.S. Pat. No. 3,579,864 shows a teaching device that includes a multiple leaf answer response sheet, card, lamps, housing and matrix. In prior U.S. Pat. No. 3,662,078 to Holiday there is shown a soft teaching machine that includes a recording and presenting means, means for advancing the recording and presenting means, displaying means and probe means. It is submitted that neither the primary prior patent to Wellington, et al, U.S. Pat. No. 3,057,082 taken alone or in conjunction with the other listed patents are anticipatory of the present invention because they do not show, whether taken individually or collectively, an automatic teaching aid comprising a box-like casing, a cover for the casing, an electric circuit board, the holes, sheet, probe, and the other features that are recited in the claims.

SUMMARY OF THE INVENTION

The present invention of an electronic teaching aid includes a frame with a cover sheet having a plurality of horizontal numbered rows, each of the numbered rows being associated with a similar numbered question being investigated. There are several small circles in each of the horizontal rows, offering different possible answers to the question associated with that row. In operating the teaching aid, a student selects the circle which he believes is the correct answer to the question and pushes the point of a probe through the circle to perforate the printed cover sheet and also a foil sheet immediately below the cover sheet. The tip of the probe then contacts an electronic circuit board below the foil sheet, and if the answer selected (the circle punched) is correct then an electrical output is produced, to be utilized, as desired, such as to activate a light, ring a bell, or motivate a computer; if incorrect, it also activates a different circuit. The electronic circuit board is interchangeable, turned over, or reversed, to conform to the order in which the correct answers appear in the horizontal rows.

A continuous supply of cover sheets is maintained inside the teaching aid case, and to better define questions being answered, rows 1 through 12 may operate a red output signal, while rows 13 through 24 may produce a green output signal.

The primary object of the invention is to provide an electronic teaching aid which is compact in size, easy and attractive to operate, and one which instantly and automatically indicates whether the answer given is correct, or incorrect.

Other objects and advantages will become apparent in the following specification when considered in light of the attached drawings.

BRIEF DESCRIPTION OF THE DRAWINGS

FIG. 1 is a perspective view of the invention ready for use;

FIG. 2 is an elevation view taken along the line 2—2 of FIG. 1;

FIG. 3 is a view of one side of one of the circuit boards showing connections between the holes;

FIG. 4 is an enlarged view of the probe puncturing the cover sheet, as when testing the answer to a question;

FIG. 5 is a view taken along the line 5—5 of FIG. 4;

DESCRIPTION OF THE PREFERRED EMBODIMENT

Figure 6:
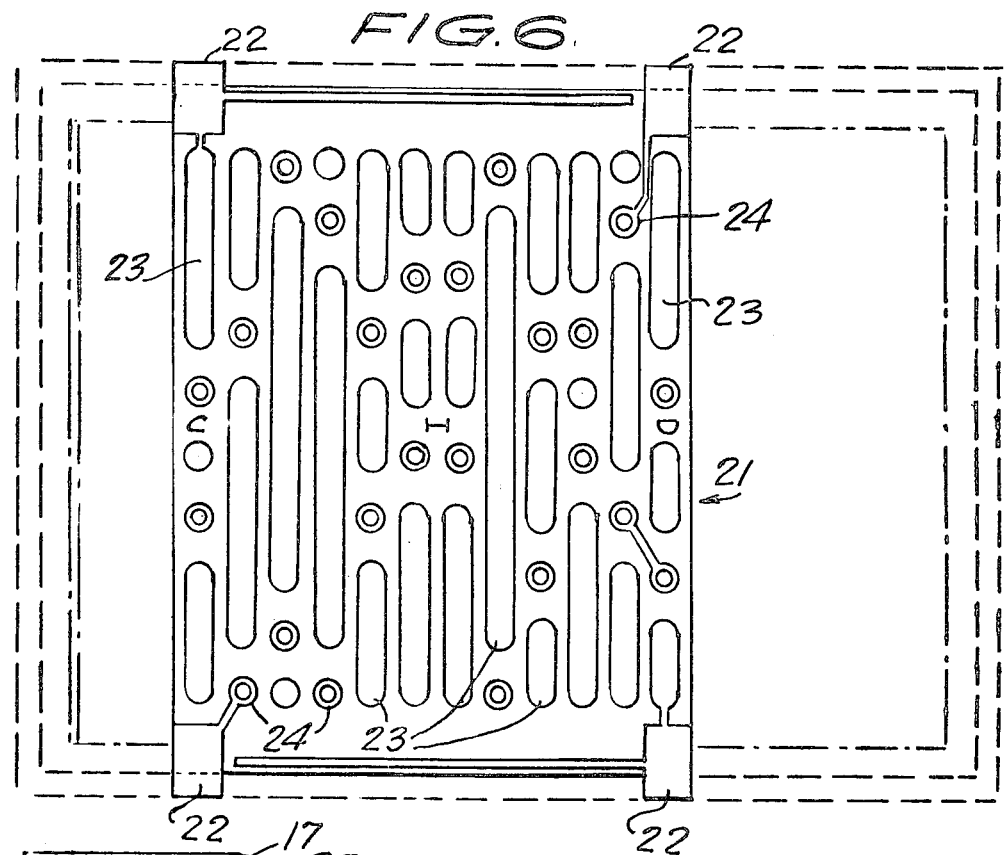
FIG. 6 is a view of another circuit board with a different set of connections.
Figure 7:
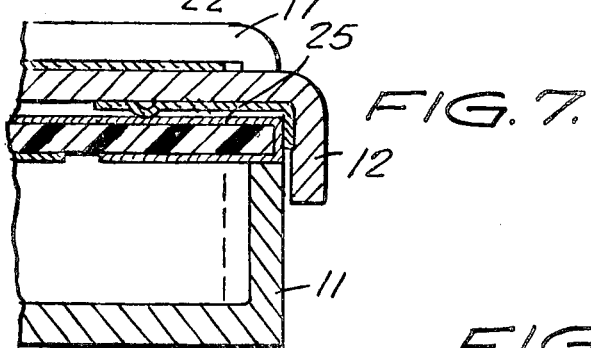
FIG. 7 is a view taken along line 7—7 of FIG. 3.

Referring now to the drawings in detail, wherein like reference characters indicate like parts throughout the several figures, the reference numeral 10 indicates generally an electronic teaching aid forming the invention and incorporating a case or container 11, with a removable cover 12. The case 11 has a slightly projecting bead 13 extending across each of its ends so as to hold the removable cover 12 in place.

Located within the confines of case 11 there is an elongated, interfolded paper sheet 14, the outer end of which extends up through a hole 15, near one end of cover 12, the sheet then passing under a restraining guide 16 attached to cover 12 and continuing along the full length of the cover. A second guide 17, nearer the far end of the cover, serves to hold the sheet 14 in place on the cover.

As clearly shown in FIG. 1 of the drawings paper sheet 14 has imprinted thereon a plurality of horizontally extending numbered rows 18, and each of the rows is made up of a plurality of small circles 19. When paper cover sheet 14 is fully pulled from case 11, and accurately positioned on case cover 12, then the plurality of horizontally extending rows 18 is exactly centered between guides 16 and 17. Across the end of sheet 14 there is space for the name of the person taking that particular test, the date, and which program the test relates to.

In the elevation view of FIG. 2 it can be seen that cover 12 has a number of holes 20 drilled through it, these holes 20 being covered by the paper cover sheet 14 when it is in place. Holes 20 are drilled in horizontally extending rows, and there are five holes in each row, thereby providing a hole beneath each of the small circles.

Also removably mounted on the underside of cover 12 there is positioned an electronic circuit board 21, such as shown in FIGS. 3 and 6. Circuit board 21 is held to cover 12 by means of L-shaped brackets 22, in the four corners of the board, and circuit-wise the board consists of a plurality of odd-shaped metallic strips 23 and circular connectors 24. The metallic strips 23 are interconnected in underlying relationship with the various incorrect answer holes and the circular connectors 25 are interconnected in underlying relationship with the various correct answer holes, as will be more fully explained hereinafter. In FIGS. 3 and 6 it will be observed that the longer sides of circuit boards 21 bear identifying letters A, B, C, or D, and it can be appreciated that due to the random arrangement of strips 23 and circular connectors 24, that by reversing B for A, or C for D, that the resulting connections with small circles 19 are also altered.

As shown best in FIG. 2, the circuit board 21 is provided with correct answer holes aligned with central openings in the circular connectors 24.

Laid across the top of circuit board 21 and thus being positioned between the board 21 and cover 12 there is a sheet of magnetic foil 25 which acts to improve the electrical connections, as will be explained.

In order to apply potential to circuit board 21, and to obtain answers to the questions there are several separate sets of wires attached to case 11. A red wire 26, having a plug 27 attached to one end, is inserted into a jack 28 that is permanently mounted into cover 12, the lower end of jack 28 having a connection 29 attached to one of the L-shaped brackets 22, which through metal strips on the circuit board 21 is interconnected to all of the circular connectors 24. The red wire 26 is utilized to apply potential to indicate incorrect answers.

A green wire 30 with a plug 31 and jack 32 mounted in cover 12 is utilized to apply potential to indicate correct answers. The lower end of jack 32 joins with a connector 33 that is attached to another L-shaped bracket 22 on the opposite side of the circuit board 21 from the previous one and which is connected to all of the metallic strips 23 on the circuit board 21.

Into the end of case 11 there is mounted a bolt connection 34, attached to which there is a white ground wire 35. At the far end of white wire 35 from the connection 34 there is a manually maneuverable probe 36 which is utilized to check the answer of a question under observation. The extreme end of probe 36 has a pointed end and dimple 37 that penetrates paper cover sheet 14 and enters holes 20 to contact the electronic circuit board 21.

Figure 8:
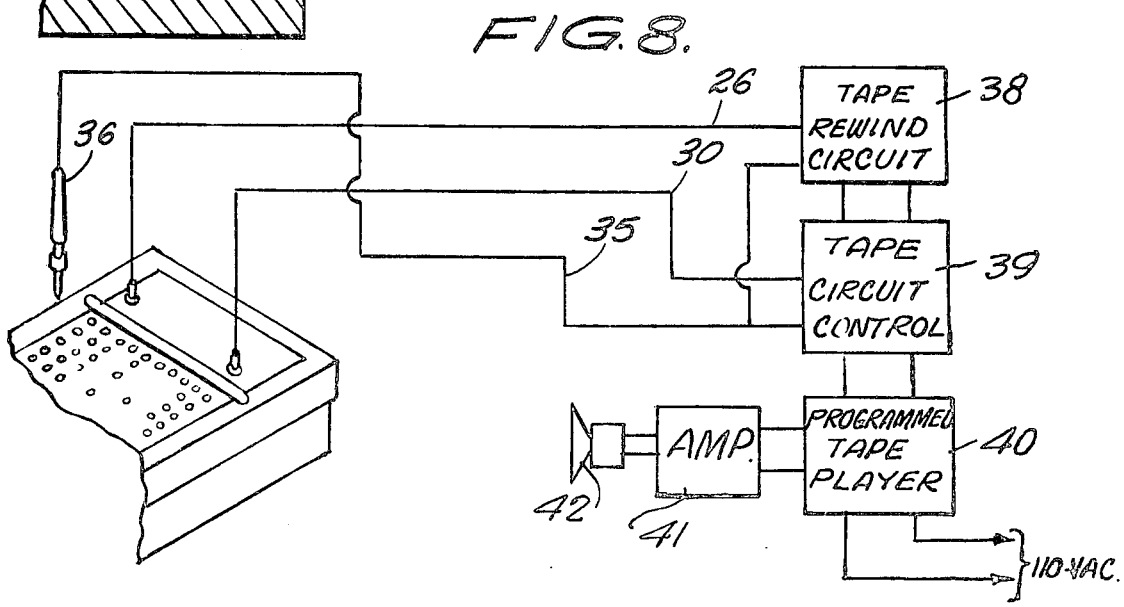
FIG. 8 shows an electrical circuit diagram for the invention.

The output of the teaching aid 10 may be utilized in any of several different manners, and a typical one is illustrated in FIG. 8. In this particular situation the output from probe 36, on white wire 35, along with red wire 26 are connected to a tape rewind circuit 38, circuit 38 then in turn being connected to a tape circuit control 39. The white wire 35, and the green wire 30 are also attached to the tape circuit control.

The output of tape circuit control 39 feeds a programmed tape player 40 whose output in turn then feeds an amplifier 41 that drives a speaker 42, all of these components operating from a standard source of potential.

In the use and operation of the invention, cover 12 of the case 11 is raised and the circuit board 21 is inserted in the L-shaped brackets 22 so that the circuit board 21 is positioned parallel with, and just beneath, cover 12. Cover 12 is then latched in place, on case 11, by means of the bead 13 along the ends of case 11.

Next the paper sheet 14 is pulled up from the lower portion of the case 11, up through the hole 15 in the lid 12, and pushed under the lower restraining guide 16. The sheet 14 is then pulled further and its free end inserted under the upper restraining guide 17, with the end of the sheet being placed near the end of cover 12 and until two preformed holes in the sheet 14 overlie jacks 28 and 32, and the name, date and program pertinent to the questions being asked by this particular sheet being used. When sheet 14 is in place there are a plurality of numbered horizontal rows 18, with their small circles 19, centered along the top of cover 12, and each of these small circles 19 is located directly over one of the holes 20 drilled through cover 12, but since sheet 14 has not been perforated at this point, holes 20 are hidden from view.

A pointed, hand held, probe 36 is connected by white wire 35 to bolt connection 34 at the topmost end of case 11, and also a red wire 26 is attached by inserting plug 27 into jack 28. Finally, a green wire 30 is connected by means of plug 31 being inserted into jack 32. Wires 26, 30 and 35 are now hooked to some chosen form of utilization equipment, such as that shown in FIG. 8, and the invention is ready for operation.

When one of the multiple-choice answers 19 has been selected, then the pointed dimple 37, on probe 36, is pushed into the small circle 19 to punch through sheet 14, the point 37 going through hole 20 and contacting one of the metallic strips 23, or circular connector 24, on the circuit board 21.

The piercing of the metallic foil 25 when the probe 36 enters the circular connector 24 causes the metallic foil to extend completely through the correct answer holes formed by the circular connectors 24, thereby assuring proper contact and operation of the associated equipment.

The automatic teaching aid of the invention can provide an automatic electric switching or signaling mechanism. It is operational when an answer has been selected and pierced by the operator. This feature utilizes an electric probe for piercing one of the answers on the specially designed key plate, and it will augment the switching mechanism circuit which can be used to restart, for example, a film cassette, a slide projector, a light and/or sound signal, whichever type of unit the switch is planned to operate. If an incorrect answer is pierced, another switching circuit will activate to return the projector and/or taped programmed unit back to the beginning of that series of learning misunderstood. This will give the mental processes an opportunity to reinvestigate and/or to more carefully reexamine the material covered. This type of arrangement can be used to continue and/or facilitate the learning process.

The electrical circuitry for all 24 horizontal rows are designed to provide a green signal, (however these could be accomplished by the green wire), for correct answers and a red signal accomplished by the red wire for incorrect answers.

1 out of 5 holes in each row will make contact to provide the correct answer. The four remaining holes will not permit the probe deep enough penetration to provide the correct answer, but does penetrate far enough to make contact with the circuit board, activating the incorrect signal.

The cover sheet will of course record, by the number of punched holes, how many wrong guesses the student made.

The student not only personally will know if he has punched the wrong answer by failure of the probe 36 to fully penetrate circuit board 21. sight, hearing, etc. This also may depend on visual or whatever means or device is used.

Having thus described the preferred embodiment of the invention it should be understood that numerous structural modifications and adaptations may be resorted to without departing from the spirit of the invention.

I claim:

1. In an automatic teaching aid, a box-like casing, a removable cover for said casing, said casing having a slightly projecting bead extending across each of its ends for holding the cover in place, an elongated interfolded paper sheet located within said casing, the outer end of which extends up through a hole near one end of the cover, a first restraining guide attached to said cover and having said sheet passing therebelow and said sheet continuing along the full length of the cover, a second guide for holding the sheet in place on the cover, said sheet having imprinted thereon a plurality of horizontally extending numbered rows, and each of the rows being made up of a plurality of small circles, and whereby when the paper sheet is fully pulled from the casing, and accurately positioned on the cover, the plurality of horizontally extending rows will be exactly centered between said guides, said cover having a number of holes therein, said last-named holes being covered by the sheet when it is in place, said last-named holes being drilled in horizontally extending rows; an electronic circuit board removably mounted on the underside of the cover, L-shaped brackets for holding the circuit board to the cover, a sheet of magnetic foil positioned across the top of the circuit board, and a manually maneuverable probe insertable through said paper sheet, said upper holes, and said magnetic foil into contact making engagement with said electronic circuit board and means for connecting said circuit board and said probe to operative circuitry for checking the answers of a question under observation.

2. The structure as defined in claim 1, wherein the sheet has a space across an end thereof for receiving indicia such as the name of the person taking the test, the date, and the program to which the test relates.

3. The device of claim 2 wherein the board consists of a plurality of odd shaped metallic strips and circular connectors selectively engageable by said probe in accordance with said hole in which said probe is inserted.

4. The device of claim 3 wherein said operative circuitry comprises an automatic electric switching or signalling mechanism.

5. The device of claim 4 wherein the circuit board can be replaced or reversed according to the subject being taught and wherein the sheet is made of perforatable material.

6. The device of claim 5 and further including means connected to the output that are advanced or retracted depending upon the particular metallic strip of the circuit board contacted by the probe when the probe passes through one of the holes in said cover.

* * * * *